United States Patent Office 3,849,566
Patented Nov. 19, 1974

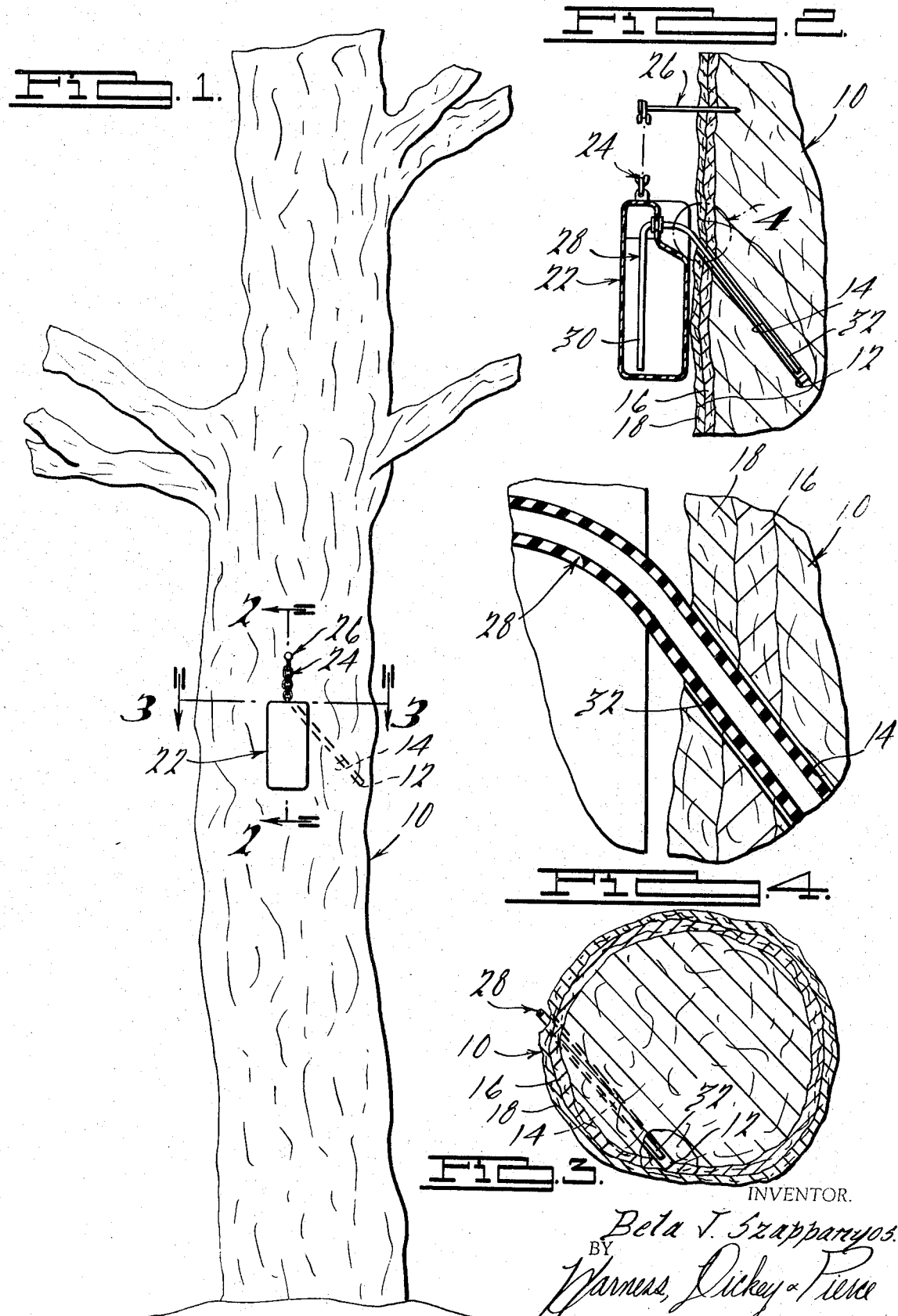

3,849,566
METHOD OF PROPHYLAXIS AND THERAPY OF SPECIES *ULMUS* FOR DUTCH ELM DISEASE CAUSED BY *CERATOCYSTIS ULMI*
Bela J. Szappanyos, 3325 Burning Bush Road, Birmingham, Mich. 48010
Filed Dec. 26, 1968, Ser. No. 786,972
Int. Cl. A01n 9/26
U.S. Cl. 424—343                                   10 Claims

ABSTRACT OF THE DISCLOSURE

The disclosure relates to a method of prophylaxis and therapy of species *ulmus* for Dutch Elm disease caused by *Ceratocystis ulmi* by the introduction of a treatment solution into the vascular system of the species *ulmus* that is lethal to the causative agent of the disease yet is compatible with the life of the tree.

BACKGROUND OF THE INVENTION

Trees exhibit a natural defense to virus and fungus pathogens to which they are exposed. Entry of the pathogen induces a mechanical defense which is based on the morphological characteristics of the tree. An example of this form of defense is necrosis at the point of entry of the pathogen, thereby preventing further penetration or translocation of the pathogen into the tree.

However, once the pathogen is firmly established in a tree and propagates, the natural biochemical resistance of the tree is called upon for defense to the infection which may take the form of a biochemical property change. It is believed that in species *ulmus*, such a biochemical property change may result in a self-defeating reaction leading to destruction of the tree itself.

Dutch Elm disease is a disease to which all species of *ulmus* are susceptible in varying degree. The etiologic agent of the disease is a fungus, *Ceratocystis ulmi*, which propagates in the vascular system of the tree.

The causative fungus of Dutch Elm disease, *Ceratocystis ulmi*, is spread most commonly by the European and American Elm bark beetles, *Scolytus multistriatus* and *Hylurgopinus rufixis*. The beetles generally enter a tree in a crotch of a high limb and feed on the bark adjacent to the cambium layer. It is in this cambium area that the beetle also reproduces. The spore of *Ceratocystic ulmi* is transported on the body of the beetle as it flies from tree to tree. The disease may also be spread from tree to tree by root grafting.

Since *Ceratocystis ulmi* is a fungus transmitted by vectors such as *Scolytus multistriatus* and *Hylurgopinus rufixis*, intergrafting of roots, etc., emphasis has heretofore focused on prophylaxis of Dutch Elm disease by mechanical control or eradication of the insect vectors. This was attempted by spraying with insecticide, zonal root destruction, as well as by destruction of infected species *ulmus*. All known attempts at such prophylaxis have, however, proved to be unsuccessful, experts now predicting eventual elimination of species *ulmus* in the United States.

SUMMARY OF THE INVENTION

Prophylaxis and therapy of species *ulmus* for Dutch Elm disease caused by *Ceratocystis ulmi* is achieved in accordance with this invention, by introducing an aqueous solution of a penetrant and a water soluble fungicide of low phytotoxicity into the vascular system of the tree. More particularly, a solution comprising, by volume, 10% dimethyl sulfoxide, 5% of a 40% solution of monosodium salt of dichlorophene in water, and 85% water is introduced into the vascular system of the species *ulmus*, so as to be systemically dispersed.

DESCRIPTION OF THE DRAWING

FIG. 1 is a fragmentary side elevational view of a tree with a solution dispenser secured thereto;
FIG. 2 is a cross sectional view taken substantially along the line 2—2 of FIG. 1;
FIG. 3 is a cross sectional view taken substantially along the line 3—3 of FIG. 1; and
FIG. 4 is an enlarged view of the subject matter within the circle "4" of FIG. 2.

DESCRIPTION OF THE PREFERRED EMBODIMENT

The first observable effects of Dutch Elm disease, namely, leaf discoloration, vascular browning and necrotic spots between veins, result from a phytotoxin comprising a glycoprotein fraction extractable from the spores of *Ceratocystic ulmi*.

It is to be noted that the phytotoxic glycoprotein has a pH of 3.5 to 4 but that it loses its phytotoxicity at a pH of 6.5 or more. Later effects to the tree are caused by the tree's own reaction to its infection, namely, the production of gums and tyloses which plug the vascular channels resulting in death of the limb or tree.

Accordingly, the inventive concept underlying the solution to the problem of Dutch Elm disease embraces the following parameters: (a) since the vascular system of the tree is where the pathogen attacks the tree, the vascular system should be the locus of attack on the disease; (b) since the vascular system of the tree is to be used to carry the therapeutic and/or prophylactic solution to the tree extremities, the treatment solution should be water soluble; (c) the treatment must be fungicidal; (d) the treatment must be compatible with cellular life of the tree; (e) one component of the treatment solution should be a penetrant to facilitate transmission of the treatment solution to the tree periphery; (f) the treatment should be toxin neutralizing; (g) the treatment should be repellant to insect vectors.

The foregoing parameters are met, in accordance with the instant invention, by employing a therapeutic and prophylactic solution comprising 10% dimethylsulfoxide, 5% of an aqueous solution of dichlorophene, and 85% water.

The dimethyl sulfoxide performs an important function as a powerful penetrant thereby to aid distribution of the solution into and through the tree's vascular system. Dimethyl sulfoxide also has the advantages of a high flash point, a low evaporation rate, and a pronounced affinity for water.

Dichlorophene is a powerful fungicide, is compatible with cellular life in the concentration used, is fungicidal to *Ceratocystis ulmi*, in the concentration used is repellant to insects, and is alkaline in the concentration used so as to raise the pH of the contacted glycoprotein of *Ceratocystis ulmi* to its inactive range.

The chemical name for dichlorophene is:

2,2'-dihydroxy - 5,5' - dichlorophenylmethane or d,2'-methylenebis - (4 - chlorophenol) or bis (5-chloro-2-hydroxy phenyl) methane.

While dichlorophene is virtually insoluble in water, an aqueous solution of its Monosodium Salt can be prepared, at a concentration of 40% of the Monosodium Salt, as follows:

Dichlorophene _____ lbs__ 100
Caustic soda flakes _____ lbs__  18
Water _____ gals__  18

The dichlorophene and caustic soda are mixed together and added to the water while stirring until solution is complete. The heat of solution of the caustic soda is usually sufficient to dissolve the dichlorophene, however, additional heating may be desirable to speed the process.

Referring now to the drawing, a tree 10 is drilled so that the terminal end 12 of a bore 14 communicates with the xylem layer 16 of the tree 10 so as to expose the xylem to the solution. Each trunk of a tree having a multiple trunk system should be treated. The xylem layer 16 contains the portion of the tree's vascular system that carries water peripherally to the branch system. The xylem layer resides inwardly of the cambium layer 18.

As best seen in FIGS. 1 and 2, a vented solution container 22, preferably made from polyethylene, is secured to the tree 10 as by a chain 24 which is secured to a nail 26 driven into the tree 10. A syphon tube 28 has one end portion 30 extending into the container and an opposite end portion 32 extending to the bottom of the hole 14 in the tree 10. Thus, as solution is absorbed into the tree's vascular system, the level of fluid decreases in the container, syphoning continues until the entire fluid content of the container 22 is syphoned into the bore 14. As best seen in FIG. 3 of the drawings, the bore 14 may be drilled along a chordal line in large trees but may extend diametrically through relatively smaller trees.

EXAMPLES

The Cranbrook Experiment

Forty species *ulmus* of the Cranbrook institutions were utilized, all of which were known to be diseased with estimates of from 10% to 90% involvement. Holes were drilled into the xylem of the tree and were filled with the treatment solution of the instant invention. The quantity of solution administered to the trees was approximately one pint of solution per foot of cumulative trunk circumference of the trunk at the treatment elevation. Control trees equal in size and generally adjacent to the treated trees and with roughly the same involvement were left untouched.

The following observations were made from the treated and controlled trees:

1. The treatment solution rapidly disseminated throughout the tree. This was identified by the characteristic odor of the solution present in the peripheral branches of the tree.
2. Within weeks after treatment, all trees were reassessed with respect to new leaf formation in diseased limbs. New leaf formation adjacent to dying leaves was common in treated trees and not noted in the control trees.
3. The incidence of survival of the treated trees through the maximum heat period of the summer, as compared with control trees was improved.
4. The incidence of positive culture for *Ceratocystis ulmi* three to six weeks following treatment was reduced from 90% correlation to clinical disease to less than 5% correlation clinical disease.
5. Several saplings not diseased were given fifty times the recommended dosage without discernible deleterious effect in one growing season.
6. Upon stripping of trunk bark from both treated and control trees, beetles were found in the control trees and none were found in the treated trees.

What is claimed is:

1. A method of treating Dutch Elm disease in species *ulmus* comprising introducing into the vascular system of the species *ulmus* an aqueous solution of a water soluble penetrant of dimethyl sulfoxide and, a water soluble fungicide of a salt solution of dichlorophene.

2. The method of claim 1 wherein the penetrant in said solution comprises about 10% dimethyl sulfoxide.
3. The method of claim 1 wherein said fungicide comprises a monosodium salt solution of dichlorophene.
4. The method of claim 2 wherein the fungicide in said solution comprises 5% monosodium salt solution of dichlorophene.
5. The method of claim 4 wherein said monosodium salt solution of dichlorophene is at an approximate 40% concentration.
6. A method of treating species *ulmus* to aid same in resisting *Ceratocystis ulmi* comprising the steps of boring a hole in the species *ulmus* that communicates with the xylem layer thereof and introducing into said hole a treatment solution comprising dimethyl sulfoxide, a salt solution of dichlorophene and water.

7. A method of treating species *ulmus* to aid same in resisting *Ceratocystis ulmi* comprising the steps of boring a hole in the species *ulmus* that communicates with the xylem layer thereof and introducing into said hole a treatment solution comprising dimethyl sulfoxide, a salt solution of dichlorophene and water, said treatment solution comprising 10% dimethyl sulfoxide, 5% of an approximate 40% concentration monosodium salt solution of dichlorophene and 85% water.

8. The method of claim 7 wherein said hole has a vertical component, suspending a container in close proximity to said hole, and syphoning said treatment solution into said hole.

9. A method of raising the pH of the glycoprotein fraction of *Ceratocystis ulmi* to species *ulmus* to a predetermined desired level comprising introduction to the species *ulmus* of a treatment solution comprising about 10% dimethyl sulfoxide, about 5% of an approximate 40% concentration of a monosodium salt solution of dichlorophene and about 85% water.

10. The method of claim 9 wherein, approximately one pint of said treatment solution is introduced to the species *ulmus* for every foot of trunk circumference at the treatment elevation.

References Cited

UNITED STATES PATENTS 3,334,012 8/1967 Herschler ........... 424—337

FOREIGN PATENTS 945,427 12/1963 Great Britain ........ 424—347

OTHER REFERENCES

Chem. Abstracts I, vol. 54 (1960) p, 18968 g.

Chem. Abstract II, vol. 61 (1964) p. 3631b.

"The Yearbook of Agriculture-Insects" (1952) U.S. Dept. of Agriculture, pp. 677–679.

VINCENT D. TURNER, Primary Examiner

U.S. Cl. X.R.

424—337